United States Patent [19]

Rodi et al.

[11] Patent Number: 5,040,180
[45] Date of Patent: Aug. 13, 1991

[54] METHOD AND DEVICE FOR SECURING DATA

[75] Inventors: Anton Rodi, Leimen; Dieter Hauck, Eberbach, both of Fed. Rep. of Germany

[73] Assignee: Heidelberger Druckmaschinen AG, Heidelberg, Fed. Rep. of Germany

[21] Appl. No.: 290,035

[22] Filed: Dec. 27, 1988

[30] Foreign Application Priority Data

Dec. 24, 1987 [DE] Fed. Rep. of Germany ....... 3744200

[51] Int. Cl.⁵ .......................................... G06F 11/00
[52] U.S. Cl. ...................................... 371/66; 371/21.1
[58] Field of Search ................. 371/66, 68.1, 67.1, 371/13, 21.1, 21.6; 365/228, 229, 189.07; 364/200 MS File, 900 MS File

[56] References Cited

U.S. PATENT DOCUMENTS

| 4,467,436 | 8/1984 | Chance | 364/200 X |
|---|---|---|---|
| 4,493,083 | 1/1985 | Kinoshita | 371/66 |
| 4,566,106 | 1/1986 | Check, Jr. | 371/67.1 |
| 4,757,441 | 7/1988 | Buckland | 364/200 |
| 4,763,333 | 8/1988 | Byrd | 371/66 |
| 4,787,026 | 11/1988 | Barnes | 364/200 |
| 4,819,237 | 4/1989 | Hamilton | 371/66 |

FOREIGN PATENT DOCUMENTS 2166893 10/1985 United Kingdom .

Primary Examiner—Jerry Smith
Assistant Examiner—Robert W. Beausoliel
Attorney, Agent, or Firm—Herbert L. Lerner; Laurence A. Greenberg

[57] ABSTRACT

A device for securing data in an electronic system of a printing machine given an impending data loss caused by influences acting on the system includes a plurality of system cards, one of the system cards having at least one processor, and at least another of the system cards being equipped with at least one nonvolatile memory, and the other system card having given memory positions containing data representing the respective status of the system card.

1 Claim, 4 Drawing Sheets

FIG. I

METHOD AND DEVICE FOR SECURING DATA

The invention relates to a device and a method of securing data in an electronic system of a printing machine given an impending loss caused by influences acting upon the system.

Stored data may get lost due to influences which are caused, for example, by maintenance work or a power failure or the like and which act on an electronic system. Data which is available at any time and is stored on an external data carrier can be input again into the system so that the status quo will be re-established. In such a case, however, this measure requires the immediate availability of an external data carrier and operating personnel having the necessary knowledge and the skill to carry out the data transfer.

A further condition, in addition to the conditions mentioned hereinbefore, is of course the availability of the equipment configuration required, for example, tape, cassette or disk reading devices. Moreover, the producer of the electronic system must provide the user with the necessary software, a consequence thereof is that a misuse of the software cannot be excluded. Another disadvantage is the time needed for such a data transfer. The measures mentioned hereinbefore demonstrate that the securing of data is effected at great expense.

Particularly in the art of printing machines to which the subject matter of the invention of the instant application primarily relates, it cannot be taken for granted that a pressman would be capable of dealing with problems relating to data transfer, because such problems require an extensive knowledge of computer science. Often, even the service personnel is overstrained by maintenance work in the field of data systems technology. With respect to such maintenance work, one should thus rely on a highly qualified service technician or on specifically trained personnel, which has disadvantageous effects on the service costs. For financial reasons, there is, however, a general tendency to provide service as much as possible, without the assistance of highly qualified service technicians.

Prior-art battery buffering constitutes one possibility of reducing these high costs. In case of a power outage, the battery supplies the electronic system with power, thus preventing an instantaneous loss of data. The data remains in the reserved storage area, and it is possible to keep the system operating at the same or at a reduced level. The operating period of the system depends on the power-supplying duration of the battery.

On the one hand, this means that it is possible to keep the system operating for several hours by dimensioning the battery accordingly and, on the other hand, the battery may be designed so that it supplies power only for a short period which is just sufficient for also securing the most current data in an external storage.

Interferences, in the electronic system, for example, when it is necessary to perform some maintenance work, cause a failure of the prior-art central battery buffering if a system card has to be interchanged or replaced. The data stored on this system card gets lost as a result of the power failure caused by the interchange of the system card.

According to the state of the art mentioned hereinabove new system cards to be introduced into the system must be provided with the current data to the extent to which the data is still available. This, too, is very costly and leads to manipulations.

Thus, it is an object of the invention to provide a device and a method which ensure that data will be secured without having to rely on external data carriers and corresponding equipment configuration and on adequate technical knowledge of the personnel operating the aforementioned equipment, respectively. Moreover, it is an object of the invention also to secure also the most current data.

With the foregoing and other objects in view, there is provided, in accordance with the invention, a device formed of more than one system card, one of the cards being equipped with at least one processor, the other system cards being provided with at least one nonvolatile memory, respectively. On each system card there are certain memory or storage positions which contain the data representing the respective status of the system card. Inter alia, nonvolatile memories or storages mean battery-buffered memories or storages.

In accordance with another aspect of the invention, a method is provided for securing data. The data representing the status of the card is checked by means of a test mask. If there should be any deviation from the test mask, the card is initialized and this initialization is marked at a certain storage position. System cards which are not provided with initialization marks are checked with respect to the plausibility of their data. The data of the system cards which were checked and considered okay are transferred to the other system cards.

The advantage of the invention is to be seen in the fact that, given a power outage or above all an interchange of system cards, it is possible to secure data without using external data carriers and the associated equipment configuration.

Other features which are considered as characteristic for the invention are set forth in the appended claims.

Although the invention is illustrated and described herein as embodied in a method and device for securing data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
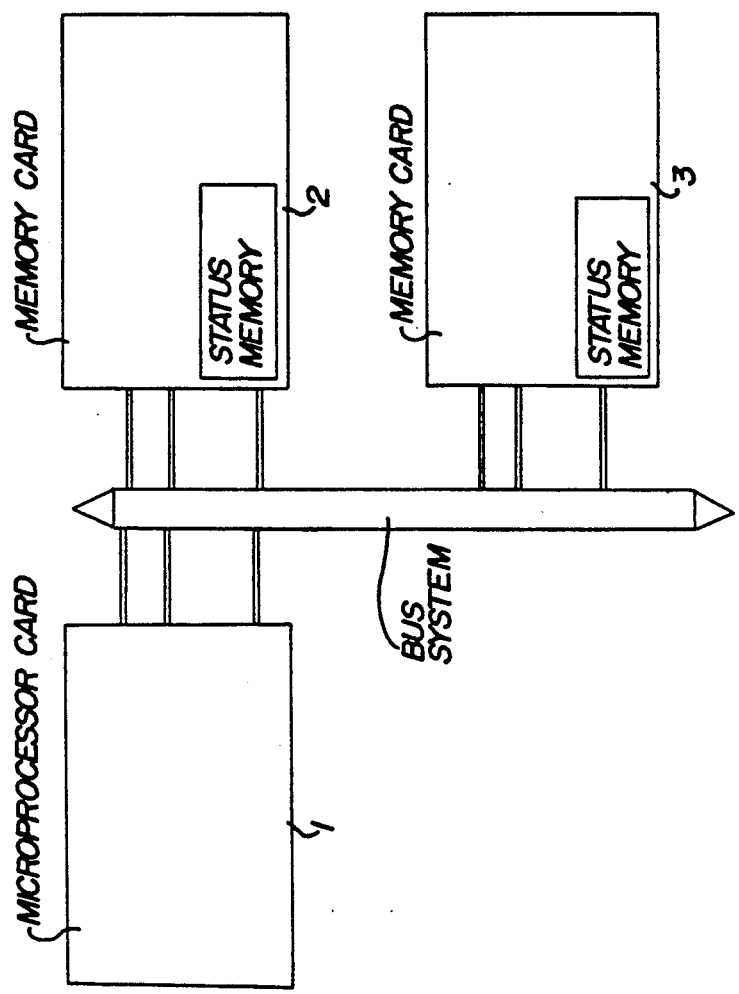
FIG. 1 is a plot diagram of the device for securing data in accordance with the invention.
Figure 2:
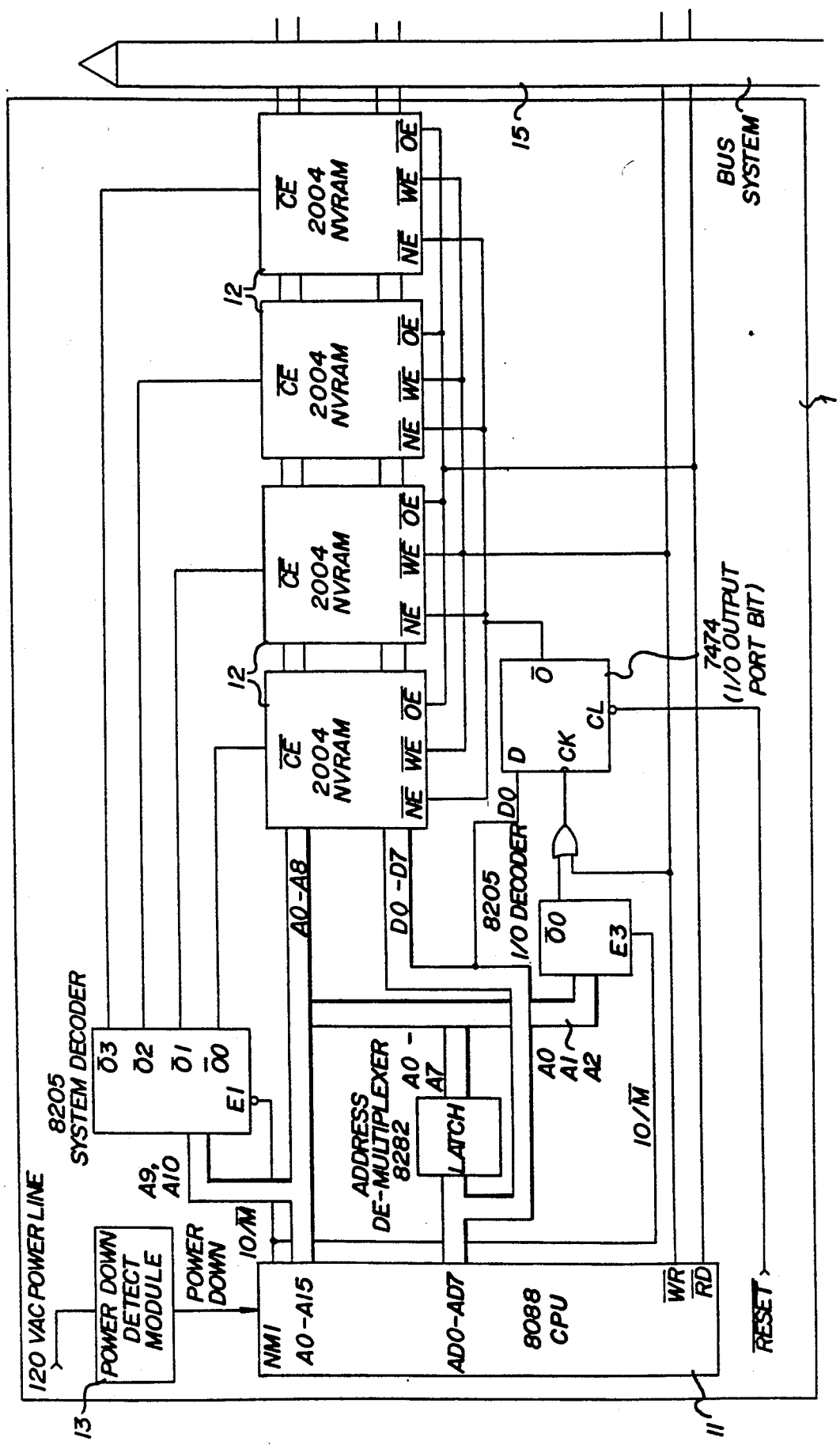
FIGS. 2, 3 and 4 are diagrammatic and schematic views of the three cards forming the device according to the invention.

Referring now to the drawing and first, particularly, to FIG. 1, there is shown therein very diagrammatically the device for securing data according to the invention, as shown more specifically in FIG. 2, card 1 is equipped with a microprocessor 11 in addition to appropriate RAM memory chips 12.

Figure 3:
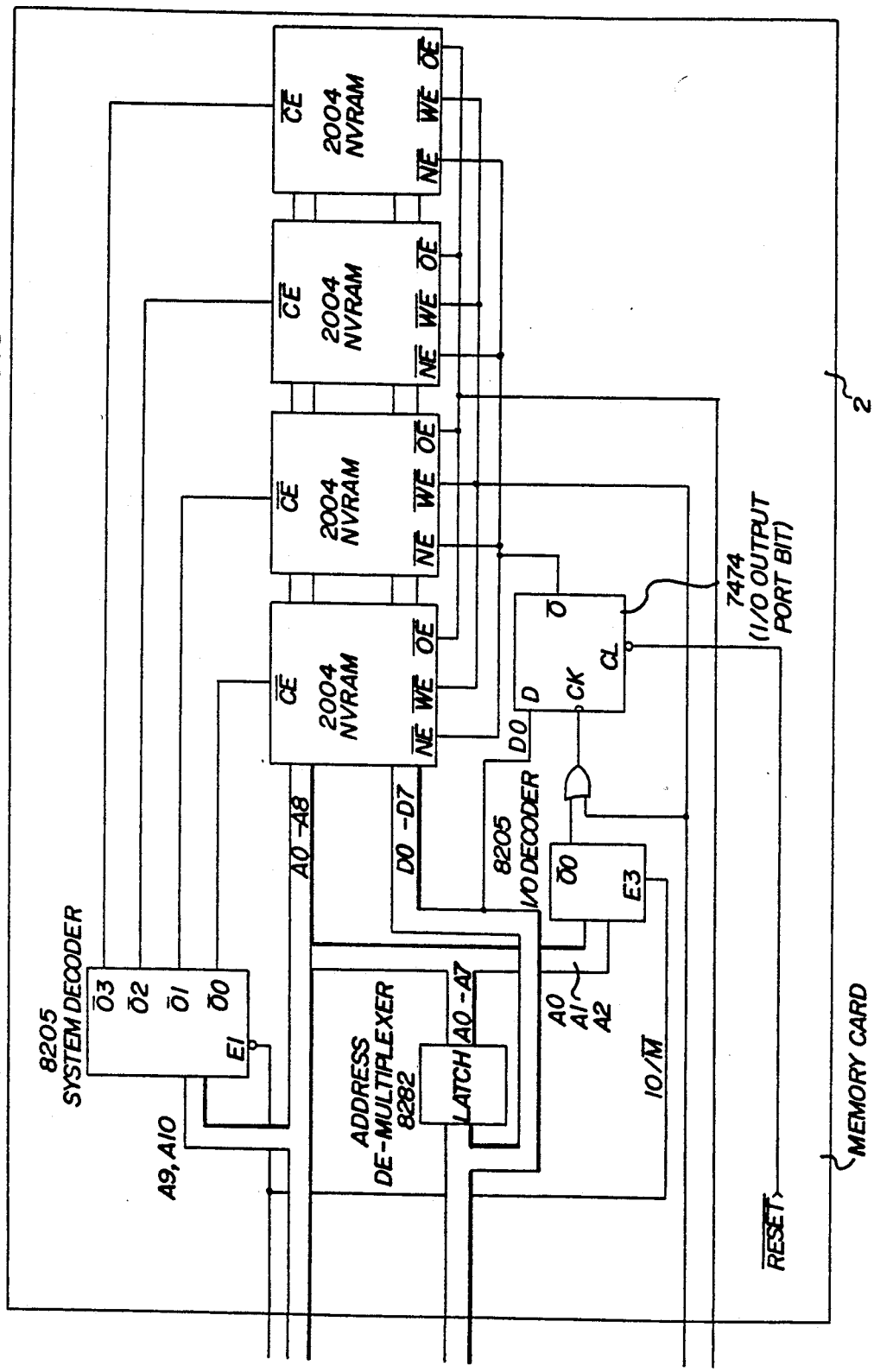
Figure 4:
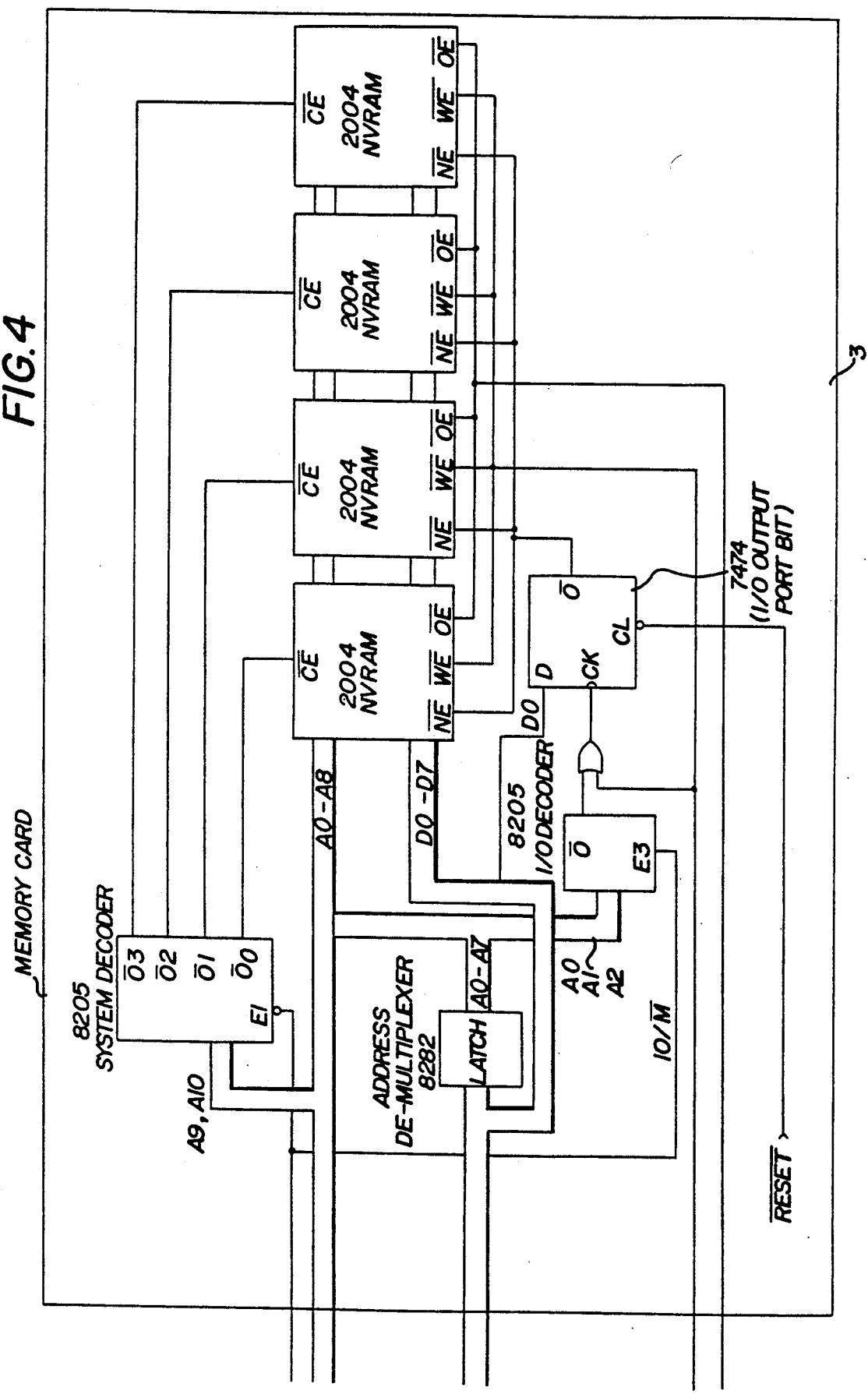

Cards 2 and 3 in FIGS. 3 and 4, respectively, are memory cards having the basic construction of card 1 except that they do not have any Power Down Detect Module 13 such as is provided in card 1, nor any microprocessor 11 such as also is provided in card 1.

As is noted in FIG. 1, the three cards 1, 2 and 3 are suitably connected to a bus system 15.

The redundant arrangement of data on different system cards is advantageous because, when removing one card, the current data is still stored on the remaining system cards. When introducing a new card, the other system cards supply this card with the current data doing without any external measures usually necessary for such a data transfer. The electronic system performs the interchange of data automatically by means of a software-operated logic. In doing so, the individual system cards are checked with respect to their respective status, when switching on the electronic system. For this purpose, on each card there are provided certain comparison storage or memory positions which are compared by means of a test mask. In this connection the test mask represents the reference arrangement of the data provided in the comparison memory or storage. If the data of the test mask is identical to the data in the comparison storage, this means that no data of the checked card has gotten lost and that this checked card supplies the data for the other system cards. If a check of the other system cards reveals that the test mask is not identical to the respective system card, the data of this card may not be considered secured. With these system cards all storage or memory positions are overwritten with a defined value (such as zero) i.e. they are initialized. Then a specific storage or memory position on each card will be provided with an initialization mark. The data of the system cards which show no initialization marks is checked with respect to their plausibility according to individually selected plausibility criteria. If the plausibility is affirmed, the data is transferred to all system cards having initialization marks. Since these processes take place without external data carriers and without manual interference, manipulation of data is almost excluded, which constitutes an advantage of this method.

Excluding the possibility of manipulating data is particularly essential e.g. in the field of business economics or to factors, such as operating hour meters, printed sheet counters, error analysis, machine states, which determine the value of a machine.

We claim:

1. Device for securing data in a processor-controlled system, comprising at least two interchangeable system cards, each having at least one non-volatile data memory for storing at least system data, system status data, an initialization mark, and a test mask for data to be secured, and at least one processor on at least one of said system cards connected to said non-volatile data memory, and means for transferring data between said non-volatile memories in response to test by said test mask indicating loss of data in the data memory of one of said system cards.

* * * * *